United States Patent [19]

Barrett

[11] Patent Number: 5,057,345

[45] Date of Patent: Oct. 15, 1991

[54] FLUOROOPOLYMER BLENDS

[75] Inventor: Leonard Barrett, Bethlehem, Pa.

[73] Assignee: Raychem Corporation, Menlo Park, Calif.

[21] Appl. No.: 395,222

[22] Filed: Aug. 17, 1989

[51] Int. Cl.$^5$ .................. C08L 27/18; C08L 27/20; C08L 53/00

[52] U.S. Cl. .................. 428/35.1; 428/378; 524/505; 524/520; 525/88; 525/193; 525/199; 522/109; 252/511

[58] Field of Search .................. 525/88, 193, 199; 524/505, 520; 522/109; 428/35.1, 76, 378; 252/511

[56] References Cited

U.S. PATENT DOCUMENTS

| | | | |
|---|---|---|---|
| 3,911,192 | 10/1975 | Aronoff et al. | 428/379 |
| 4,031,167 | 6/1977 | Aronoff et al. | 260/884 |
| 4,158,678 | 6/1979 | Tatemoto et al. | 204/159.2 |
| 4,200,568 | 4/1980 | Trautvetter et al. | 525/199 |
| 4,935,467 | 6/1990 | Cheng | 525/199 |

FOREIGN PATENT DOCUMENTS

| | | |
|---|---|---|
| 0131203 | 1/1985 | European Pat. Off. |
| 0132834 | 2/1985 | European Pat. Off. |
| 0105433 | 4/1985 | European Pat. Off. |
| 0159268 | 10/1985 | European Pat. Off. |
| 0168020 | 1/1986 | European Pat. Off. |
| 0199991 | 11/1986 | European Pat. Off. |
| 0225792 | 6/1987 | European Pat. Off. |
| 023701 | 6/1985 | Japan . |

OTHER PUBLICATIONS

WO 88/07063 (1988) Cheng et al.
DuPont, Research Disclosure No. 19002, p. 59, (Feb. 1980).
World Patent Index No. 84-124883/20 (abstract of JP59-062635).
World Patent Index No. 84-097000/16 (abstract of JP59-041351).
WO 87/06597 (1987) Johnson et al.
Japanese Abstract: JP 52086442 (1977) Daikin Kogyo.
Article: Kawachi Cummi Fasern Kunstoffe 39, No. 4, pp. 162-166 (1986).

*Primary Examiner*—Melvyn I. Marquis
*Assistant Examiner*—David Buttner
*Attorney, Agent, or Firm*—Yuan Chao; Herbert G. Burkard

[57] ABSTRACT

A polymer blend comprises (A) a fluorinated ethylene-propylene copolymer and (B) a fluoroelastomer. The fluoroelastomer comprises a block copolymer comprising at least one elastomeric segment comprising tetrafluoroethylene, vinylidene fluoride, and hexafluropropylene repeat units in a mole ratio 45–90:5–50:0–35 and at least one nonelastomeric segment comprising tetrafluoroethylene and ethylene repeat units. The weight per cent of copolymer (A) relative to the combined weights of copolymer (A) and fluroelastomer (B) is between about 70% and about 97% or between about 3% and about 30%.

24 Claims, No Drawings

FLUOROOPOLYMER BLENDS

BACKGROUND OF THE INVENTION

This invention relates to blends of a fluoroplastic and a fluoroelastomer, methods therefor, and articles made therefrom.

Fluoroplastics are unique among polymers, offering performance characteristics unobtainable with most other polymers. Commercially available fluoropolymers include polytetrafluoroethylene (PTFE), fluorinated ethylene-propylene copolymer (FEP), perfluoroalkoxy resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), and polyvinylfluoride (PVF). Some fluoroplastics such as PTFE are completely fluorinated, while others such as ETFE or PVDF are only partially fluorinated.

Fluoroplastics generally are thermoplastics, processable by conventional thermoforming techniques such as extrusion and molding, thereby facilitating their fabrication into shaped articles. Typically, they are characterized by high melting points and low glass transition temperatures, enabling them to be advantageously used over a wide temperature range, such as from well below 0° C. to +260° C. Other desirable properties of fluoroplastics include their excellent solvent resistance, electrical insulative properties, low coefficient of friction, low flammability, low gas permeability, and high inertness and stability. However, a limitation of many fluoroplastics is their susceptibility to stress-cracking.

Thermoplastic elastomers are materials which combine the properties of a thermoplastic and an elastomer. They can be melt processed like a thermoplastic, but, upon cooling, exhibit rubbery properties, without the need for covalent crosslinking. The development of these rubbery properties may be achieved by several methods. One method is to blend a crystalline polymer and an elastomer. Another method is to block copolymerize an elastomer with a crystalline thermoplastic, to form a block copolymer having elastomeric and crystalline domains. The copolymer may be configured such that the ends are crystalline blocks with the middle being elastomeric, or the blocks can be alternating, with many blocks per molecule.

Thermoplastic fluoroelastomers are fluorinated thermoplastic elastomers, possessing the melt processability of other fluoroplastics, along with the aforementioned desirable solvent resistance, thermal stability, electrical, and other characteristics of fluoroplastics. However, unless crosslinked, they tend to have inferior or moderate mechanical strength relative to fluoroplastics. In some instances it is possible to improve mechanical properties by blending them with a fluoroplastic; however, more often the resulting blend has inferior properties relative to the predicted properties based on the weight average of the two components — that is, there is negative synergism.

Blending of two or more polymers is a common practice for producing a product composition having improved mechanical, rheological, and/or degradative properties compared to those of the individual polymers. It can be a very effective way to customize a composition, providing highly specific properties which may not be available in any single known polymer or which would require the time-consuming and expensive development of a hitherto unknown new polymer.

Although virtually an infinite number of different polymer blends is possible, not all polymer blends result in compositions with desirable properties. If the component polymers are incompatible, the resultant blend often will have inferior properties, particularly in the case of blends involving fluoropolymers. Normally, incompatibility is the rule, and compatibility is the exception. A rigorous and technically precise definition of a compatible blend is a blend in which the constituents are capable of forming a single phase mixture, at least in the amorphous phase, if not the crystalline phase as well. However, at a practical level a compatible blend is often defined as one which displays useful properties. In this application, this latter definition of compatibility will be used.

Disclosures of blends in which a component is a fluorinated elastomer include copending, commonly assigned U.S. application Ser. No. 07/166,954, filed Mar. 11, 1988 (European equivalent published as EP 304,487 (1989)), which discloses a blend of ETFE or PVDF with a thermoplastic fluoroelastomer. Also, Japanese patent application 52-086,442 (1977) by Daikin Kogyo KK discloses a composition comprising (a) tetrafluoroethylene/hexafluoropropene copolymer and (b) a fluorinated elastomer such as hexafluoropropene/vinylidene fluoride copolymer, tetrafluoroethylene/vinylidene fluoride/hexafluoropropene copolymer, and tetrafluoroethylene/propylene copolymer.

We have discovered that certain blends of a fluoroplastic and a fluoroelastomer are characterized by unexpected and useful properties such as high tensile strength or elongation, low modulus, increased flexibility, improved stress-crack resistance, stress-induced crystallization, and/or optical clarity. These blends are useful as wire and cable jacketing or insulation, dimensionally heat-recoverable articles, conductive polymeric compositions (when filled with conductive particles), and chemically resistant hoses.

SUMMARY OF THE INVENTION

This invention provides a polymer blend comprising (A) a fluorinated ethylene-propylene copolymer and (B) a block copolymeric fluoroelastomer comprising at least one elastomeric segment comprising tetrafluoroethylene, vinylidene fluoride, and hexafluoropropylene repeat units in a mole ratio 45-90:5-50:0-35 and at least one nonelastomeric segment comprising tetrafluoroethylene and ethylene repeat units;
the weight per cent of copolymer (A) relative to the combined weights of copolymer (A) and fluoroelastomer (B) being about 70-97% or about 3-30%.

DESCRIPTION OF PREFERRED EMBODIMENTS

The fluorinated ethylene-propylene copolymer (or FEP) used in the blends of this invention is a copolymer having tetrafluoroethylene (TFE)

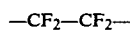

and hexafluoropropylene (HFP)

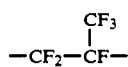

repeat units. Preferably, the FEP is predominantly random and has a relatively low HFP content, between about 1 and about 15 weight % based on the total weight of TFE and HFP. Preferably the molecular weight is between about 100,000 and about 600,000. A preferred FEP is available from E. I. du Pont de Nemours & Co., under the trade name Teflon FEP.

In accordance with this invention, FEP is blended with a block copolymeric fluoroelastomer, having elastomeric and non-elastomeric segments (or blocks). The elastomeric segment comprises tetrafluoroethylene, vinylidene fluoride, and hexafluoropropylene repeat units

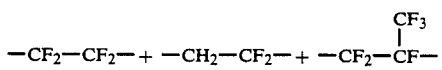

with preferred relative weight ratios of about 20–40:40–60:10–30, respectively. The nonelastomeric segment comprises substantially alternating tetrafluoroethylene and ethylene repeat units

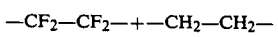

A preferred weight ratio of elastomeric to nonelastomeric segments of between about 70–95:30–5. Such a thermoplastic fluoroelastomer is available from Daikin Inc. (Japan) under the trade name Dai-el T530.

Other preferred fluoroelastomers, which may contain iodine, are disclosed in Tatemoto et al., U.S. Pat. No. 4,158,678 (1979), the disclosure of which is incorporated herein by reference.

The elastomeric segment preferably has a molecular weight of from about 10,000 to about 10,000,000. The nonelastomeric segment preferably has a molecular weight of from about 1,000 to about 1,000,000, more preferably from about 5,000 to about 500,000.

The weight percent of copolymer (A) relative to the combined weights of copolymer (A) and fluoroelastomer (B) is preferably between about 70 and 97% or between about 3 and 30%, more preferably between about 80 and about 95% or between about 5 and 20%.

The blends of this invention can be prepared by melt blending the components in a twin screw extruder, Banbury mixer, Brabender Plasticorder torque rheometer, Buss kneader, or other plastics processing equipment at temperatures above the melting temperatures of the copolymer (A) and fluoroelastomer (B).

Various additives can be added to the polymeric composition. Such additives include, for example, antioxidants such as alkylated phenols, e.g. those commercially available as Goodrite 3125, Irganox 1010, Irganox 1035, Irganox 1076, Irganox 1093, Vulkanox BKF, organic phosphite or phosphates, e.g. dilauryl phosphite, Mark 1178, alkylidene polyphenols, e.g. Ethanox 330, thio-bis alkylated phenol, e.g. Santonox R, dilauryl thio-dipropionate, e.g. Carstab DLTDP, dimyristyl thiodipropionate, e.g. Carstab DMTDP, distearyl thiodipropionate, e.g. Cyanox STDP, amines, e.g. Wingstay 29, etc.; UV stabilizers such as [2,2'-thio-bis(4-t-octylphenolato)] n-butylamine nickel, Cyasorb UV 1084, 3,5-ditertiarybutyl-p-hydroxybenzoic acid, UV Chek AM-240; flame retardants such as decabromodiphenyl ether, perchloropentacyclodecane, 1,2-bis(tetrabromophthalimido)ethylene; pigments such as titanium dioxide, antimony trioxide, zinc oxide, iron oxide, and the like. Mixtures of such additives can be used.

The composition of this invention has numerous uses. In general, the composition has good electrical insulating characteristics. The compositions can be formed into shaped articles, coatings, and the like by melt processing or other suitable techniques. A preferred use of the composition of this invention is as an insulation for an elongate electrical conductor, such as a wire, or as a jacket for a cable, such as a signal, power, or heating cable.

Another preferred use is in the preparation of heat recoverable articles, particularly articles for use as wire and cable harnessing. A heat recoverable article is one whose dimensional configuration may be made to change when subjected to an appropriate treatment. Usually these articles recover, on heating, towards an original shape from which they previously have been deformed but the term "heat-recoverable," as used herein, also includes an article which, on heating, adopts a new configuration, even if it has not been previously deformed.

In their most common form, heat-recoverable articles comprise a heat-shrinkable sleeve made from a polymeric material exhibiting the property of elastic or plastic memory as described, for example, in U.S. Pat. No. 2,027,962; 3,086,242; and 3,597,372. As is made clear in, for example, U.S. Pat. 2,027,962, the original dimensionally heat-stable form may be a transient form in a continuous process in which, for example, an extruded tube is expanded, while hot, to a dimensionally heat-unstable form but, in other applications, a preformed dimensionally heat stable article is deformed to a dimensionally heat unstable form in a separate stage.

In the production of heat recoverable articles, the polymeric material may be crosslinked (as discussed more fully below) at any stage in the production of the article that will enhance the desired dimensional recoverability. One manner of producing a heat-recoverable article comprises shaping the polymeric article into the desired heat-unstable form, subsequently cross-linking the polymeric material, heating the article to a temperature above the crystalline melting point of the polymer, deforming the article, and cooling the article whilst in the deformed state so that the deformed state of the article is retained. In use, since the deformed state of the article is heat-unstable, application of the heat will cause the article to assume its original heat-stable shape.

In another embodiment of the invention, the composition is rendered conductive by dispersing conductive fillers such as carbon black, metal powder, metal flakes, graphite fiber, metal coated particles or fibers, or the like therein. The amount of conductive particles added depends on the desired resistivity of the composition. In general, about 0.5 to about 50, preferably about 5 to about 40 and most preferably about 5 to about 25 weight %, based on the weight of copolymer (A) and fluoroelastomer (B) are added. The conductivity of the conductive polymeric composition varies depending on the use of the composition. In a preferred embodiment, the resistivity is below about 100,000 ohm-cm, more preferably below about 2,000 ohm-cm. The resisitivity is also preferably greater than about 0.01, more preferably 0.1 ohm-cm.

Conductive compositions of this invention are particularly useful as conductive jackets for electrical cables. For example, the composition can be applied as a conductive jacket on a high frequency attenuative cable as discussed in U.S. Pat. No. 4,347,487. The conductive compositions can also be used to prepare electric devices such as heaters, sensors, circuit protectors, such as those disclosed in U.S. Pat. No. 3,861,029; 4,177,376; 4,188,276; 4,318,881; 4,388,607; 4,413,301; 4,426,339; 4,237,441; 4,238,812; 4,286,376; 4,352,083; and 4,591,700, the disclosures of which are incorporated herein by reference.

The compositions of this invention may optionally be cross-linked. Cross-linking can be achieved for example by use of a suitable cross-linking agent, such as a peroxide or amine, or by irradiation. In a preferred embodiment, the composition is crosslinked by irradiation. The dosage employed in the irradiation step is generally below about 50 Mrads to ensure that the polymer is not degraded by excess irradiation, although in certain applications a higher dosage may be desirable or even necessary. The dosage preferably employed depends upon the extent of crosslinking desired, balanced against the tendency of the polymer to be degraded by high doses of irradiation. Suitable dosages generally are in the range of 2 to 4 Mrads, for example 2 to 30 Mrads, preferably 3 to 20 Mrads, especially 4 to 25 Mrads, particularly 4 to 15 Mrads. The ionizing radiation can for example be in the form of accelerated electrons or gamma rays. Irradiation is generally carried out at about room temperature, but higher temperatures can also be used.

Prior to irradiation it is preferred to incorporate a cross-linking agent into the composition. Preferred radiation cross-linking agents contain carbon-carbon unsaturated groups in a molar percentage greater than 15, especially greater than 20, particularly greater than 25, based on the total molar amount of copolymer (A) and fluoroelastomer (B). In many cases the crosslinking agent contains at least two ethylenic double bonds, which may be present, for example, in allyl, methallyl, propargyl, or vinyl groups. We have obtained excellent results with crosslinking agents containing at least two allyl groups, especially three or four allyl groups. Particularly preferred crosslinking agents are triallyl cyanurate (TAC) and triallyl isocyanurate (TAIC); other specific crosslinking agents include triallyl trimellitate, triallyl trimesate, tetraallyl pyromellitate, the diallyl ester of 1,1,3-trimethyl-5-carboxy-3-(p-carboxyphenyl-)indane. Other crosslinking agents which are known for incorporation into fluorocarbon polymers prior to shaping, for example those disclosed in U.S. Pat. No. 3,763,222; 3,840,619; 3,894,118; 3,911,192; 3,970,770; 3,985,716; 3,995,091; 4,031,167; 4,155,823; and 4,353,961. Mixtures of crosslinking agents can be used.

In a preferred embodiment, the compositions of this invention consist essentially of copolymer (A), fluoroelastomer (B), and non-polymeric additives such as stabilizers, conductive particles, crosslinking agents, and the like, and are substantially free of polymeric components other than (A) and (B).

The practice of this invention can be further understood by reference to the following example, which is provided by way of illustration and not of limitation.

EXAMPLE 1

A fluorinated ethylene-propylene copolymer (Teflon FEP 140 from du Pont) was melt blended with a thermoplastic block copolymeric fluoroelastomer (Dai-el T530 from Daikin, Inc. (Japan)), using a Brabender Plasticorder torque rheometer equipped with a forty cubic centimeter mixing chamber. The lower melting constituent (T530, melting point about 220° C.) was added first to the mixing chamber and allowed to melt. The higher melting Teflon FEP (melting point about 260° C.) was then added. After completion of addition of the constituent polymers, the composition was blended for 5 min at 300° C. The blend was then removed, and allowed to cool.

Using this method, blends containing 10, 20, 35, 50, 65, 89 and 90% by volume of Teflon FEP were prepared. Additionally, to provide control samples of Teflon FEP and Daiel T530 with the same heat and shear history as the blend sample, samples of 100% Teflon FEP and 100% Daiel T530 were processed in the Brabender in like manner.

6×6×0.03 inch slabs of the blends (and controls) were molded at 285° C. under 25,000 psi using a hydraulic hot press, for 3 min. Dumbbell shaped tensile specimens, about 1.5 in. long overall (testing region about 0.9 in long) were cut from the slabs. Stress-strain curves were obtained using an Instron mechanical tester, with at least seven specimens tested for each blend or control. The mechanical properties of the blends and control samples are provided in Table I below.

TABLE I

MECHANICAL PROPERTIES OF TEFLON FEP/DAI-EL T530 BLENDS

| % FEP | Tensile Strength | | Young's Modulus | |
|---|---|---|---|---|
| | (psi) | St. Dev. | (psi) | St. Dev. |
| 100 | 2,467 | 133 | 18,597 | 694 |
| 90 | 3,187 | 344 | 15,860 | 350 |
| 80 | 3,288 | 322 | 13,810 | 410 |
| 65 | 1,941 | 116 | 9,970 | 550 |
| 50 | 1,613 | 84 | 3,880 | 170 |
| 35 | 1,749 | 113 | 1,593 | 196 |
| 20 | 2,016 | 195 | 929 | 61 |
| 10 | 1,838 | 181 | 700 | 25 |
| 0 | 1,048 | 56 | 483 | 17 |

It can be seen that in each instance the modulus is higher than for the T530 alone, and that most blends also have a higher tensile strength. Further, at FEP contents of 80–90%, the tensile strength of the blends are higher than even for FEP alone, a most surprising result considering that the FEP has been blended with a polymer of lesser mechanical strength. These results indicate that FEP and Dai-el T530 TPFE are unexpectedly highly mechanically compatible. Additionally, the blends are quite clear, a characteristic which may suggest compatibility.

The effect of aging at 232° C. for 1000 hr on mechanical properties was also evaluated, with results provided in Table II below:

TABLE II

MECHANICAL PROPERTIES OF TEFLON FEP/DAI-EL T530 BLENDS

| % FEP | Ultimate Tensile Strength (psi) | | Elongation (%) | |
|---|---|---|---|---|
| | Unaged | Aged* | Unaged | Aged* |
| 100 | 4114 | 2951 | 644 | 291 |
| 95 | 4745 | 3005 | 779 | 342 |
| 92.5 | 3436 | 3580 | 694 | 381 |
| 90 | 4088 | 3182 | 708 | 359 |
| 85 | 3988 | 3001 | 756 | 343 |
| 80 | 3772 | 2764 | 762 | 351 |

*Aged 1000 hr at 232° C.

These results show that there is significant improvement in the retention of elongation after aging, compared to 100% FEP.

What is claimed is:

1. A polymer blend comprising (A) a copolymer of tetrafluoroethylene and hexafluoropropylene and a block copolymeric fluoroelastomer comprising tetrafluoroethylene, vinylidene fluoride, and hexafluoropropylene repeat units in a mole ratio 45-90-:5-50:0-35 and at least one elastomeric segment comprising tetrafluoroethylene and ethylene repeat units;

the weight percent of copolymer (A) relative to the combined weights of copolymer (A) and fluoroelastomer (B) being about 70-90%.

2. A blend according to claim 1, wherein the weight percent of copolymer (A) relative to the combined weights of copolymer (A) and fluoroelastomer (B) is about 80-95%.

3. A blend according to claim 1, further comprising a crosslinking agent, selected from the group consisting of triallyl isocyanurate, triallyl cyanurate, triallyl mellitate, triallyl mesate, tetraallyl pyromellitate, and the diallyl ester of 1,1,3-trimethyl-5-carbonxy-3-(p-carboxyphenyl)indane.

4. A blend according to claim 1, which has been crosslinked.

5. A blend according to claim 1, which has been crosslinked by irradiation.

6. A heat recoverable article made from a blend according to claim 1.

7. A heat recoverable article made from a blend according to claim 1, which has been crosslinked.

8. An elongate electrical conductor coated with a blend according to claim 1.

9. A cable having a jacket of a blend according to claim 1.

10. A cable according to claim 9, which is a heating cable.

11. A conductive composition comprising a composition according to claim 1 further comprising a conductive filler dispersed therein.

12. A cable having a jacket of a composition according to claim 11.

13. A polymer blend comprising (A) a copolymer of tetrafluoroethylene and hexafluoropropylene and (B) a block copolymeric fluoroelastomer comprising tetrafluoroethylene, vinylidene fluoride, and hexafluoropropylene repeat units in a mole ratio 45-90-:5-50:0-35 and at least one elastomeric segment comprising tetrafluoroethylene and ethylene repeat units;

the weight percent of copolymer (A) relative to the combine weights of copolymer (A) and fluoroelastomer (B) being about 3—30%.

14. A blend according to claim 13, wherein the weight percent of copolymer (A) relative to the combined weights of copolymer (A) and fluoroelastomer (B) is about 5-20%.

15. A blend according to claim 13, further comprising a crosslinking agent selected from the group consisting of triallyl isocyanurate, triallyl cyanurate, triallyl mellitate, triallyl mesate, tetraallyl pyromellitate, and the diallyl ester of 1,1,3-trimethyl-5-carboxy-3-(p-carboxyphenyl)indane.

16. A blend according to claim 13, which has been crosslinked.

17. A blend according to claim 13, which has been crosslinked by irradiation.

18. A heat recoverable article made from a blend according to claim 13.

19. A heat recoverable article made from a blend according to claim 13, which has been crosslinked.

20. An elongate electrical conductor coated with a blend according to claim 13.

21. A cable having a jacket of a blend according to claim 13.

22. A cable according to claim 21, which is a heating cable.

23. A conductive composition comprising a composition according to claim 13 further comprising a conductive filler dispersed therein.

24. A cable having a jacket of a composition according to claim 23.

* * * * *

UNITED STATES PATENT AND TRADEMARK OFFICE
CERTIFICATE OF CORRECTION

PATENT NO. : 5,057,345

INVENTOR(S) : Barrett

DATED : October 15, 1991

It is certified that error appears in the above-identified patent and that said Letters Patent is hereby corrected as shown below:

On the title page, item (54) and column 1, in the title, replace "FLUOROOPOLYMER" with --FLUOROPOLYMER--.

Cover Page, References Cited [56], Foreign Patent Documents, line 8, replace "023701" by --6023701--.

Column 1, line 1, replace "Fluoroopolymer" by --Fluoropolymer--.

Column 6, line 7, replace "89" by --80--.

Claim 1, line 4, before "a block" insert --(B)--.

Claim 1, line 12, replace "90%." by --97%.--.

Claim 3, line 2, replace "agent," by --agent--.

Claim 3, line 5, replace "5-carbonxy-3" by --5-carboxy-3--.

Signed and Sealed this

Thirtieth Day of August, 1994

Attest:

BRUCE LEHMAN

*Attesting Officer*  *Commissioner of Patents and Trademarks*